United States Patent
Thomaser et al.

(10) Patent No.: US 12,203,507 B2
(45) Date of Patent: Jan. 21, 2025

(54) FLUID CONDUCTING ASSEMBLY FOR A MULTI-PLATE CLUTCH AND CLUTCH UNIT

(71) Applicant: GKN Automotive Limited, Birmingham (GB)

(72) Inventors: Kurt Thomaser, Welsberg Bozen (IT); Peter Raffin, Kiens (IT); Thomas Messner, Olang (IT); Hanspeter Putzer, Gais (IT)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/571,408

(22) PCT Filed: Jun. 23, 2021

(86) PCT No.: PCT/EP2021/067169
§ 371 (c)(1),
(2) Date: Dec. 18, 2023

(87) PCT Pub. No.: WO2022/268310
PCT Pub. Date: Dec. 29, 2022

(65) Prior Publication Data
US 2024/0288036 A1 Aug. 29, 2024

(51) Int. Cl.
*F16D 13/72* (2006.01)
*F16D 13/52* (2006.01)
(Continued)

(52) U.S. Cl.
CPC ............. *F16D 13/74* (2013.01); *F16D 13/52* (2013.01); *F16H 48/22* (2013.01); *F16H 57/043* (2013.01);
(Continued)

(58) Field of Classification Search
CPC ...... F16D 13/74; F16D 13/72; F16D 25/0638; F16D 57/043; F16D 57/0427; F16D 13/52
See application file for complete search history.

(56) References Cited

U.S. PATENT DOCUMENTS

| 4,841,807 A | 6/1989 | Merkler |
| 8,388,486 B2 | 3/2013 | Ekonen et al. |

(Continued)

FOREIGN PATENT DOCUMENTS

| DE | 102011086376 B4 | 5/2015 |
| DE | 102015220446 B3 | 12/2016 |
| EP | 3354920 A1 | 8/2018 |

OTHER PUBLICATIONS

International Search Report and Written Opinion for PCT/EP2021/067169 mailed Mar. 11, 2022 (10 pages; with English translation).

*Primary Examiner* — Stacey A Fluhart
(74) *Attorney, Agent, or Firm* — Reising Ethington P.C.

(57) ABSTRACT

A fluid guide assembly for a friction disk clutch comprises an inner disk carrier having a carrier portion, a shoulder portion, and a shaft portion. The carrier portion has a connecting structure for receiving inner disks in a rotationally fixed and axially movable manner; and a fluid guide element which is fixedly connected to the inner disk carrier and which comprises an annular catching portion in which inflowing fluid can be caught, and a plurality of circumferentially distributed tab portions which extend in the axial direction and which each have a radial through-opening. The inner disk carrier has, directed radially outwardly, a plurality of longitudinal grooves which extend axially from the shoulder portion into the carrier portion and which are covered by tab portions of the fluid guide element.

18 Claims, 3 Drawing Sheets

(51) Int. Cl.
*F16D 13/74* (2006.01)
*F16H 48/22* (2006.01)
*F16H 57/04* (2010.01)

(52) U.S. Cl.
CPC ..... *F16H 57/0473* (2013.01); *F16H 57/0483* (2013.01); *F16D 13/72* (2013.01)

(56) References Cited

U.S. PATENT DOCUMENTS

| | | | |
|---|---|---|---|
| 10,295,002 B2* | 5/2019 | Hill | F16D 13/683 |
| 10,337,566 B2* | 7/2019 | Miles | F16D 13/52 |
| 2010/0065395 A1* | 3/2010 | Baer | F16D 25/123 |
| | | | 192/70.2 |
| 2014/0174877 A1* | 6/2014 | Penz | F16D 13/72 |
| | | | 192/70.12 |
| 2017/0102065 A1 | 4/2017 | Ohmura et al. | |
| 2020/0378450 A1* | 12/2020 | Desing | B60K 17/02 |
| 2022/0154782 A1* | 5/2022 | Iwasaki | F16D 13/62 |
| 2022/0186788 A1* | 6/2022 | Van Dingenen | F16D 13/385 |

\* cited by examiner

FLUID CONDUCTING ASSEMBLY FOR A MULTI-PLATE CLUTCH AND CLUTCH UNIT

CROSS-REFERENCE TO RELATED APPLICATIONS

This application is a national stage of, and claims priority to, Patent Cooperation Treaty Application No. PCT/EP2021/067169, filed on Jun. 23, 2021 which application is hereby incorporated herein by reference in its entirety.

BACKGROUND

A wet clutch unit for a motor vehicle is known from DE 10 2015 220 446 B3. It comprises a friction clutch with first friction disks associated with a drive element and second friction disks associated with a driven element, which form a friction disk pack. The first friction disks have first recesses and the second friction disks have second recesses. The first and second recesses overlap in radial and axial directions to form a friction disk pack recess. A fluid distributor is fixed to the drive element and comprises a fluid chamber and a fluid guide channel. The fluid chamber extends in the axial direction into the friction disk pack recess so that fluid can be supplied to the friction disk pack. The fluid guide channel extends in the axial direction to a bearing to supply fluid thereto.

DE 10 2011 086 376 B4 describes an oil supply device for multi-disk brakes running in slip mode in a transmission module. The oil supply device comprises an oil channel whose oil flow is controlled by a valve and provides additional oil quantities at defined spots during slip operation phases. For this purpose, an inner disk carrier is provided with a collecting channel running around a constant diameter. Oil sprayed onto the collecting channel reaches the planetary gear set and the multi-disk brake through slotted holes in the inner disk carrier.

A clutch assembly for a drive train of a motor vehicle is known from EP 3 354 920 A1, the clutch assembly having a wet-running friction disk clutch, a support plate against which the disk pack is axially supported, an axially movable pressure plate for acting on the disk pack, an actuating device for the friction disk clutch and a flow controller for controlling an oil volume flow through the clutch. The inner plate carrier of the clutch has several holes in an axial overlap area with the disk pack, through which lubricant can flow to the disk pack. The flow controller has a setting member, adjustable by the actuating device, with a plurality of orifice portions to cover the opening areas of the orifices. This enables the oil supply to be controlled according to requirements.

U.S. Pat. No. 8,388,486 B2 describes a driveline with a rear drive axle that can be drivingly connected or disconnected as required. For this purpose, a controllable clutch is provided in the rear differential assembly between the differential and a side shaft.

SUMMARY

The disclosure relates to a fluid guide assembly for a clutch unit, and to a clutch unit with such fluid guide assembly and a wet-running friction disk clutch. Friction disk clutches are used in drivelines for frictional torque transmission between two drive components, such as drive shafts and/or drive wheels. They enable the connection of drivelines at any speed differences under torque load. Wet friction disk clutches comprise several friction disks which are cooled and/or lubricated by a surrounding fluid, for example oil.

In general, a sufficient oil supply for friction disk clutches is important in order to sufficiently lubricate components rotating relative to each other and to dissipate heat generated by friction. In this context, high torques at low speeds can be provided with a sufficiently large cooling capacity.

The present disclosure includes a fluid guide assembly which enables a reliable fluid supply and which is easy to produce. A clutch unit can include such a fluid guide assembly, which provides a sufficiently good cooling performance, in particular during slip operation of the clutch.

According to the disclosure, a fluid guide assembly for a friction disk clutch is described. The fluid guide assembly includes an inner disk carrier having a longitudinal axis and comprising a carrier portion, a shoulder portion and a shaft portion. The carrier portion includes, radially to an outer side, a connecting structure with circumferentially distributed projections and recesses for receiving inner disks with a matching counter structure in a rotationally fixed and axially movable manner. The carrier portion includes a fluid guide element axially fixed to the inner disk carrier. The fluid guide element includes an annular catching portion in which inflowing fluid can be caught, and a plurality of circumferentially distributed tab portions extending in axial direction, each having a radial through opening. The inner disk carrier includes, directed radially outwards, a plurality of circumferential longitudinal grooves extending axially from the shoulder portion into the carrier portion. The tab portions of the fluid distribution member are received outside in and/or covering the longitudinal grooves of the inner disk carrier so that a fluid passage through which fluid can flow is formed between each of the longitudinal grooves and the associated tab portions.

The fluid guide assembly offers the advantage that the fluid can flow quickly from the catch portion along the tabs of the fluid guide element in the longitudinal grooves of the inner disk carrier to the disk pack. Due to the circumferentially distributed tabs, the fluid is distributed over the circumference. In this respect, the fluid guide element can also be described as a fluid distribution element. Due to the longitudinal grooves in the inner disk carrier, a stepless geometry is provided, which favours a uniform fast flow of the fluid. Overall, this provides very efficient passive cooling, so that the fluid guide assembly is particularly well suited in clutch units for transmitting high torques at low speeds.

The fluid is used to dissipate heat generated by friction and to lubricate the components that come into frictional contact with each other. In this respect, the fluid can also be described as a coolant or lubricant. Generally, oil is used as the fluid. The fluid, which passes through the annular gap between the free end of the catch portion and the shaft portion, can collect at the annular catch portion and flow axially from here towards the carrier portion. In this case, the front part of the oil guide can have a circumferentially closed oil catch geometry which is firmly mounted on the inner plate carrier. Thus, the fluid deflected radially outwards by the rotating inner disk carrier is collected and flows along the inner wall of the catch portion to the tab portions.

According to an embodiment, the annular catch portion can have a radially inwardly directed neck at its axial end. This neck prevents the fluid from flowing back out of the annular portion back into the housing interior in which the inner disks carrier is rotatably mounted. Alternatively or additionally, the fluid conducting element can widen conically in the axial direction from the axial end to the tab portions. Both measures contribute to an improved flow behaviour or a larger fluid volume flow and thus to efficient cooling.

The annular catch portion of the fluid distribution element can be closed all around and extend axially beyond the shoulder portion. The annular catch portion can project beyond the side face of the shoulder element, e.g., by a length of at least 0.1 or 0.2 times the axial length of the carrier portion. Due to this design, the catch portion forms a relatively large annular space in which oil can collect and flow from here to the disk portions.

Following the annular catching portion, the fluid distribution element can have a connecting portion, in particular a cylindrical connecting portion, which is fitted onto an outer circumferential face of the shoulder portion of the carrier element. Thereby, according to a possible embodiment, the fluid connection element may be connected to the carrier element by a force-fitting connection, for example by means of a press connection. Alternatively or additionally, the fluid conducting element can also be connected to the carrier element by form-fitting connection elements, for example by a snap-in connection. Corresponding snap-in elements could be provided on the cylindrical connecting portion and/or on the ends of the tab portions.

The shape of the tab portions is in principle arbitrary can be adapted to the design of the longitudinal grooves of the inner disk carrier. For example, the tab portions can be shaped as elongated elements that extend in the axial direction, i.e., parallel to the longitudinal axis. The tab portions can also be referred to as web elements. According to a possible embodiment, the tab portions of the fluid distribution element may have radially outwardly directed depressions. The depressions can be shaped as elongated formations and/or concavities. The depressions increase the moment of inertia in the radial direction, so that the stiffness is improved and bending at high speeds is prevented. The depressions or concavities can have a lower height than the radial height of the connecting structure. Radial gaps may be provided between the tab portions and the disks.

At least a partial number of the radial through openings of the tab portions can be positioned axially offset to each other. In this way, the oil can flow to the disk pack in different axial areas and/or different transverse planes, so that an even distribution of the oil and a good cooling effect over the length is achieved. A particularly favourable arrangement of the through openings in the plate portions is such that all openings together cover at least half, e.g., two-thirds, of the length of the connecting structure for the disks. The number of circumferentially distributed tabs can be chosen as required, for example the fluid distribution element can have two, three, four or more tab portions, which can be evenly distributed over the circumference. The number and arrangement of the circumferentially distributed tab portions can correspond to the number and arrangement of the longitudinal grooves in the inner disk carrier.

The tab portions cover the longitudinal grooves of the inner disk carrier radially outwards so that a substantially closed channel is formed between the respective longitudinal groove and the associated tab portion through which the fluid flows to the opening. In embodiments with radially outwardly directed, longitudinally extending concavities of the tab portions, this forms a trough shape in which the oil flows to the opening. For a targeted oil flow to the respective opening, it is advantageous if the tab portions largely cover the longitudinal grooves. For this purpose, the tab portions, each in radial view, can cover a clear area of the associated longitudinal groove, for example, by at least 90%.

According to an embodiment, the oil catch geometry can be made of a metallic material as a sheet metal formed part. Alternatively, it can be made of plastic, which can offer design advantages, such as providing clamping or latching features.

The inner disk carrier can be manufactured as a forged part and/or by mechanical processing. The longitudinal grooves and the connecting structure can be produced by forming or machining.

The longitudinal grooves can be arranged circumferentially between two recesses of the connecting structure respectively. The maximum width of the tab portions may, for example, be smaller than the circumferential distance between three or two circumferentially adjacent recesses of the connecting structure. The bottom of the longitudinal grooves of the inner disk carrier can be at a smaller radius than a deepest portion of the connecting structure for the inner disks. In other words, with respect to an outer circumferential face of the disk carrier, the tooth elements for the disks may extend radially outwards, while the grooves are formed radially inwards. The depth of the longitudinal grooves may be, for example, between 0.5 and 1.5 times the radial height of the connecting structure. The longitudinal grooves can extend over at least 75% of the axial extent of the connecting structure for the disks. At their end in the shoulder portion, the grooves may have radially inwardly directed flutes so that fluid from the catch portion can flow well into the grooves. At their opposite end, the longitudinal grooves can be axially closed.

The inner disk carrier can have a central longitudinal bore and several radial through-openings to the longitudinal grooves distributed around the circumference. This allows an additional oil supply to the disks from the central inner opening of the disk carrier. Depending on the operating condition, the openings can also prevent a fluid build-up in the fluid channels. In this respect, fluid can flow from the longitudinal grooves through the radial openings into the central longitudinal bore and thus re-enter the fluid circuit, whereby further components, such as bearings or seals, can be lubricated. The central longitudinal bore can have an internal recess, wherein the radial through-openings are formed in the carrier portion in the axial overlap area of the internal recess with the outer longitudinal grooves.

A clutch unit for a driveline of a motor vehicle includes a wet-running friction disk clutch with an outer disk carrier in which a disk pack of outer disks and inner disks is arranged; a support plate against which the disk pack is axially supported; an axially movable pressure plate for axially acting on the disk pack; an actuating device for actuating the friction disk clutch by axially moving the pressure plate; and a fluid guide assembly according to one or more of the above-mentioned embodiments. The inner disk carrier is rotatably mounted relative to the outer disk carrier about the axis of rotation. Inner disks of the disk pack are connected to the connecting structure of the inner disk carrier in a rotationally fixed and axially movable manner, so that, upon rotational movement of the inner disk carrier, fluid flows from the catch portion along the inner wall of the fluid distribution element to the tab portions in order to lubricate the disk pack.

The clutch unit enables the engagement or disengagement of a driveline as required. The clutch unit may be designed for the driveline for a vehicle with a driven axle, for an all-wheel drive vehicle, for a hybrid vehicle and/or an electric vehicle. The clutch unit may be located anywhere in the drivetrain in the power path between a drive source and the wheels, for example upstream, in or downstream of a transmission gearing and/or upstream, in or downstream of an angular gearing and/or upstream, in or downstream of a power transfer unit (PTU) and/or within a propeller shaft or upstream, in or downstream of a differential gearing and/or in a side shaft.

A clutch unit according to the disclosure has the advantage that it can provide high torques at low speeds due to the efficient oiling system. The fluid distribution assembly acts in a supportive manner to enable the full potential of the clutch unit. Oil received in the catch portion of the fluid directing element is directed to the longitudinal grooves where it can flow further outwards to the disk pack through the holes in the plate portions as a result of centrifugal force. The oil can return to the oil sump through corresponding holes in the outer disk carrier. The flowing oil can also cool and lubricate other movable mechanical components such as bearings or seals.

To actuate the clutch, a controllable actuating device can be provided, which can move the pressure plate in the direction of the disk pack, i.e., in the closing direction, or can move the pressure plate away from the disk pack, i.e., in the opening direction. In principle, the actuating device can have any design to generate a pressure force. For example, an electromotive or hydraulic actuator can be used. An electromotive actuator can comprise a rotary drive and a ball ramp assembly that converts a rotary movement into an axial movement.

A transmission assembly for a drivetrain of a motor vehicle comprises a differential gearing arranged to distribute an input torque to two output parts, and a clutch unit as described above. The shaft portion of the inner disk carrier is connected in a rotationally fixed manner to one of the two output parts. Such a transmission assembly can transmit torque introduced by a propeller shaft to the associated axle, or disconnect the drive axle, as required, with all intermediate positions of the friction clutch also being possible.

BRIEF DESCRIPTION OF THE DRAWINGS

Example embodiments are described below with reference to the figures in the drawings.

FIG. 3 shows a detail of the fluid guide assembly of FIG. 2 with the oil flow drawn in.

DETAILED DESCRIPTION

Figure 1:
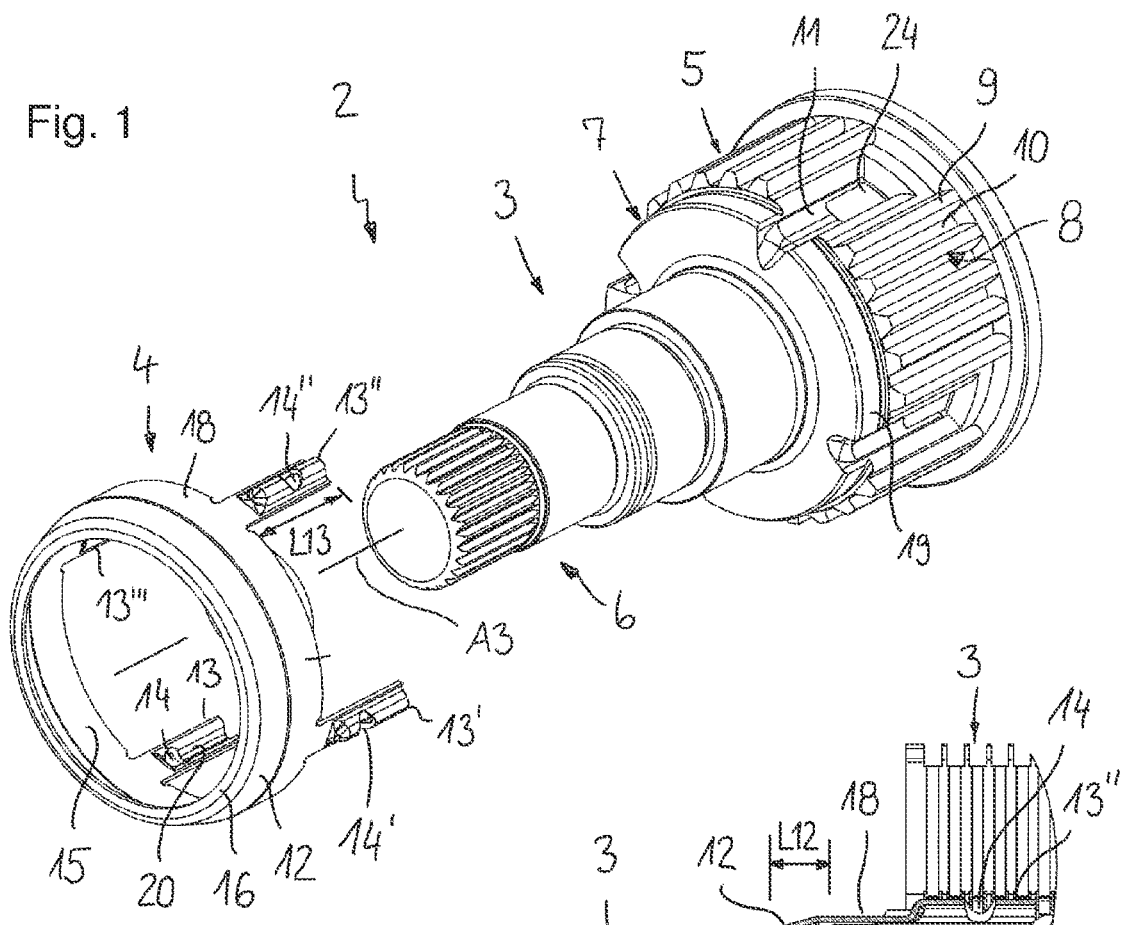
FIG. 1 shows a three-dimensional exploded view of a fluid guide.
Figure 2:
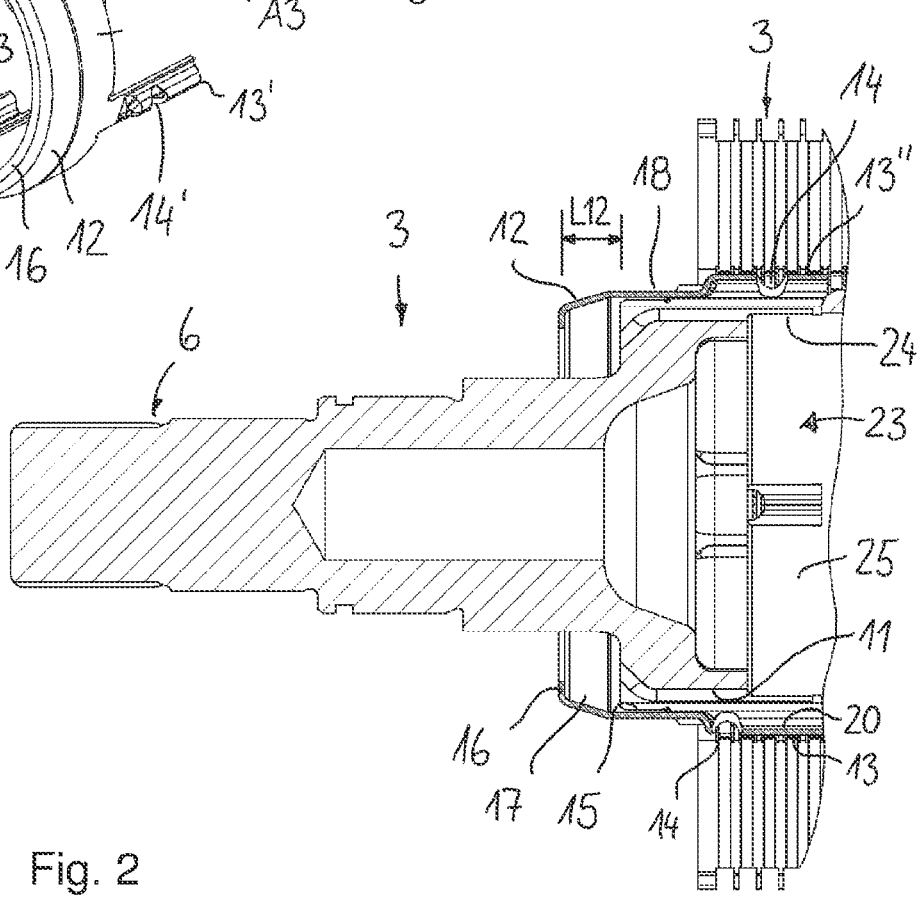
FIG. 2 shows a longitudinal section of the fluid guide assembly shown in FIG. 1 with a disk pack.
Figure 3:
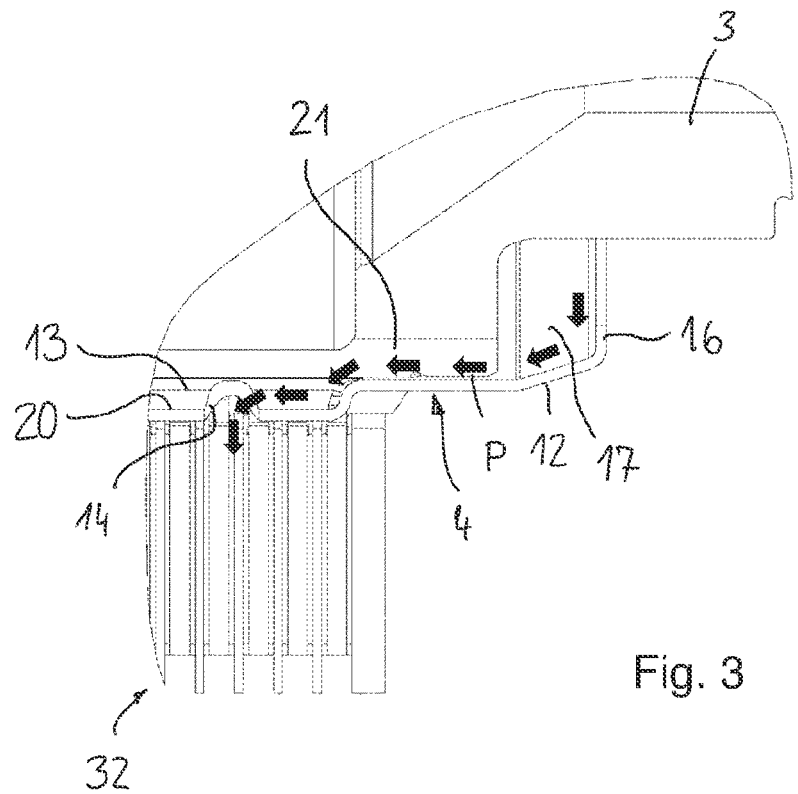
Figure 4:
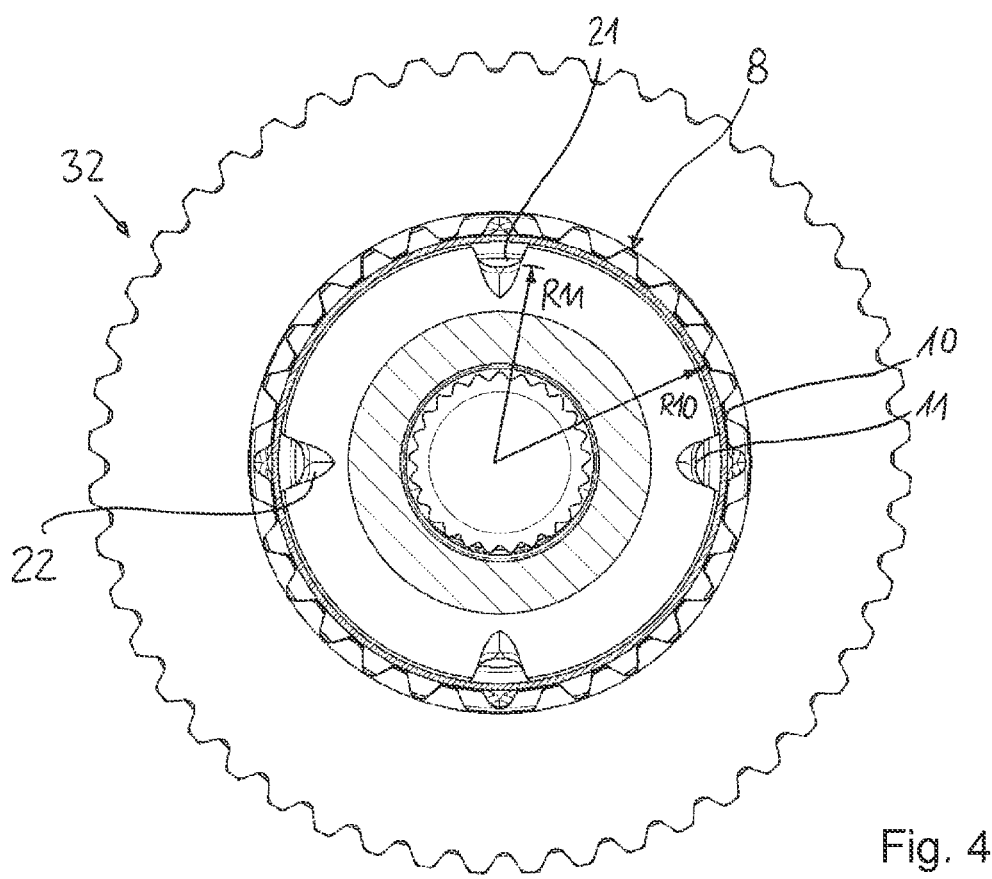
FIG. 4 shows the fluid guide assembly from FIG. 1 with disk package in cross-section in axial view.

FIGS. 1 to 3, which are described together below, show a fluid guide assembly 2 for a friction disk clutch, e.g., for a driveline of a motor vehicle.

The fluid guide assembly 2 has an inner disk carrier 3 with a longitudinal axis A3 and a fluid guide element 4, which are firmly connected to each other. The inner disk carrier 3 comprises a carrier portion 5 for inner disks, a shaft portion 6 for a rotationally fixed connection to a drive part, and a shoulder portion 7 arranged therebetween. The carrier portion 5 has a radially outer connection structure 8 with projections 9 and recesses 10 distributed over the circumference, to which inner disks with a matching counter structure can be connected in a rotationally fixed and axially movable manner. Furthermore, the inner disk carrier 3 comprises, on a radially outer circumferential face distributed over the circumference, a plurality of longitudinal grooves 11 which extend axially from the shoulder portion 7 into the carrier portion 5. The inner disk carrier 3 can be manufactured, for example, by forging as a formed part, although alternatively or additionally it can also be manufactured by mechanical, chip-removing machining, such as turning, drilling or milling. The fluid conducting element 4 can, for example, be manufactured as a sheet metal forming part from a metallic material or from plastic.

The fluid conducting element 4 has an annular catch portion 12, in which inflowing fluid can be caught, and several tab portions 13 distributed over the circumference, which extend in the axial direction and which each include a radial through-opening 14. The tab portions are generally referred to with the reference sign 13, wherein individual tabs are also provided with 13, 13', 13", 13'''. The same applies analogously to the openings 14. As can be seen in particular in FIG. 2, the tab portions 13 are accommodated outside in the longitudinal grooves 11 of the inner disk carrier 3 and/or cover the longitudinal grooves radially to the outside. The inner disk carrier 3 and the fluid conducting element 4 cooperate in an advantageous manner in that cooling oil can easily flow from the catch portion 12 along the inner wall 15 of the fluid conducting element 4 into the longitudinal grooves 11 of the carrier element and/or along the tab portions 13 and through the openings 14 of the fluid conducting element 4 to the disk pack. The flow path is shown with arrows P in FIG. 3. The longitudinal grooves 11 in the inner disk carrier 3 provide a stepless geometry so that the cooling oil can flow well to the disk pack. Further exemplary details are described below.

The annular catch portion 12 has a radial neck 16 at its axial end, which forms a support for the oil located in the annular space 17 and thus prevents the oil from flowing back. As can be seen in particular in FIG. 2, the wall of the catch portion 12 widens conically from the radial neck 16 in the direction of the tab portions 13. The annular catch portion 12 projects laterally beyond the shoulder portion 7 in the axial direction of the shaft portion 6. The length of the catch portion 12 can be, for example, at least 0.1 or 0.2 times the length of the tab portions 13.

Between the projecting catch portion 12 and the tab portions 13, the fluid conducting element 4 can have a connecting portion 18, in particular a cylindrical connecting portion, which is seated on the outer circumferential face 19 of the shoulder portion 7 with a press connection. It is understood that other connections connecting the fluid conducting element 3 to the inner disk carrier 3 can also be provided, for example form-fitting and/or material-fitting connections.

The tab portions 13 extending axially away from the annular base member each have, extending from the base member, a radially outwardly curved depression 20 which can also be referred to as concavity. The depressions result in a higher rigidity so that the tabs do not bend even at higher speeds. The height of the concavity can be designed in such a way that the tabs are always without contact with the clutch disks. The radial through openings 14 to the disks are arranged in the concavities 20.

It can be seen, in particular in FIGS. 1 and 2, that the radial through openings 14 are arranged axially offset to each other in the tab portions 13. In this way, the oil can flow to the disk pack in different axial areas and/or different transverse planes. In the four tab portions 13, 13', 13", 13"' shown here, one opening 14 is axially adjacent to the ring portion, one opening 14' is axially offset a little therefrom, another opening 14" is approximately in a central area of the tab and one is adjacent to the end of the tab.

The tab portions 13 form a cover for the longitudinal grooves 11 of the inner disk carrier 3, so that a substantially closed channel 21 is formed between the longitudinal grooves 11 and the tab portions 13, through which the fluid flows to the openings 14. The radially outwardly directed longitudinal concavities 20 form a trough shape along which the oil flows and then emerges from the respective opening 14 due to centrifugal force. For a targeted oil flow to the respective opening, the tab portions 13 largely cover the longitudinal grooves 11, for example by at least 90%.

Due to the circumferentially distributed longitudinal grooves 11, several circumferentially distributed connecting segments are formed therebetween, which jointly form the connecting structure 8 of the inner disk carrier 3. Each connecting segment is formed as a longitudinal toothing with teeth and gaps therebetween. The longitudinal grooves 11 are circumferentially adjacent to recesses 10 of the connecting structure 8. In other words, the bottom of the longitudinal grooves 11 of the inner disk carrier 3 lies on a smaller radius R11 than the deepest areas of the recesses 10 (R10). For example, the depth of the longitudinal grooves may be between 0.5 times and 1.5 times the radial height of the connecting structure 8. The longitudinal grooves 11 have a closed end in the axial direction, and they may extend over at least 75% of the axial length of the connecting structure 8. The width of the longitudinal grooves 11 and/or the tab portions 13 may, for example, be smaller than the circumferential distance between three or two circumferentially adjacent recesses 10. At the shoulder-side ends, the longitudinal grooves 11 may have radially inwardly directed recesses 22 in the shoulder portion 7, so that fluid from the catch portion 12 can flow particularly well into the grooves 11.

The inner disk carrier 3 can have a central longitudinal opening 23 and several radial through-openings 24 distributed around the circumference to the longitudinal grooves 11. This allows excess oil to drain radially inwards to prevent oil build-up in the fluid channels, or depending on the operating condition, additional oil can also be supplied to the disks from the central inner opening 23 of the disk carrier. The central longitudinal opening 23 may have an inner recess 25, wherein the radial through openings 24 in the carrier portion 5 are formed in the axial overlap area of the inner recess 25 with the outer longitudinal grooves 11. In this way, the radial openings 24 can be produced in a simple manner, in particular without separate drilling processes.

Figure 5:
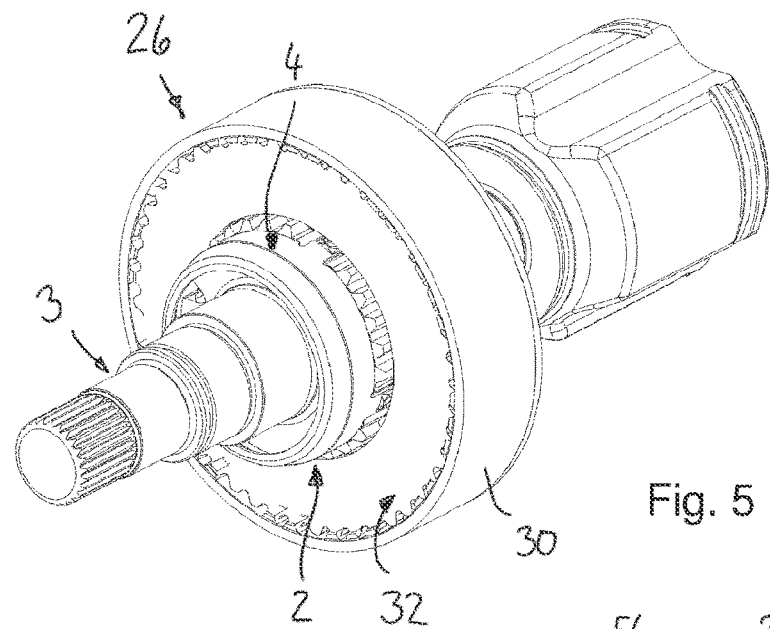
FIG. 5 shows a three-dimensional representation of a clutch unit with a fluid guide assembly as shown in FIG. 1.
Figure 6:
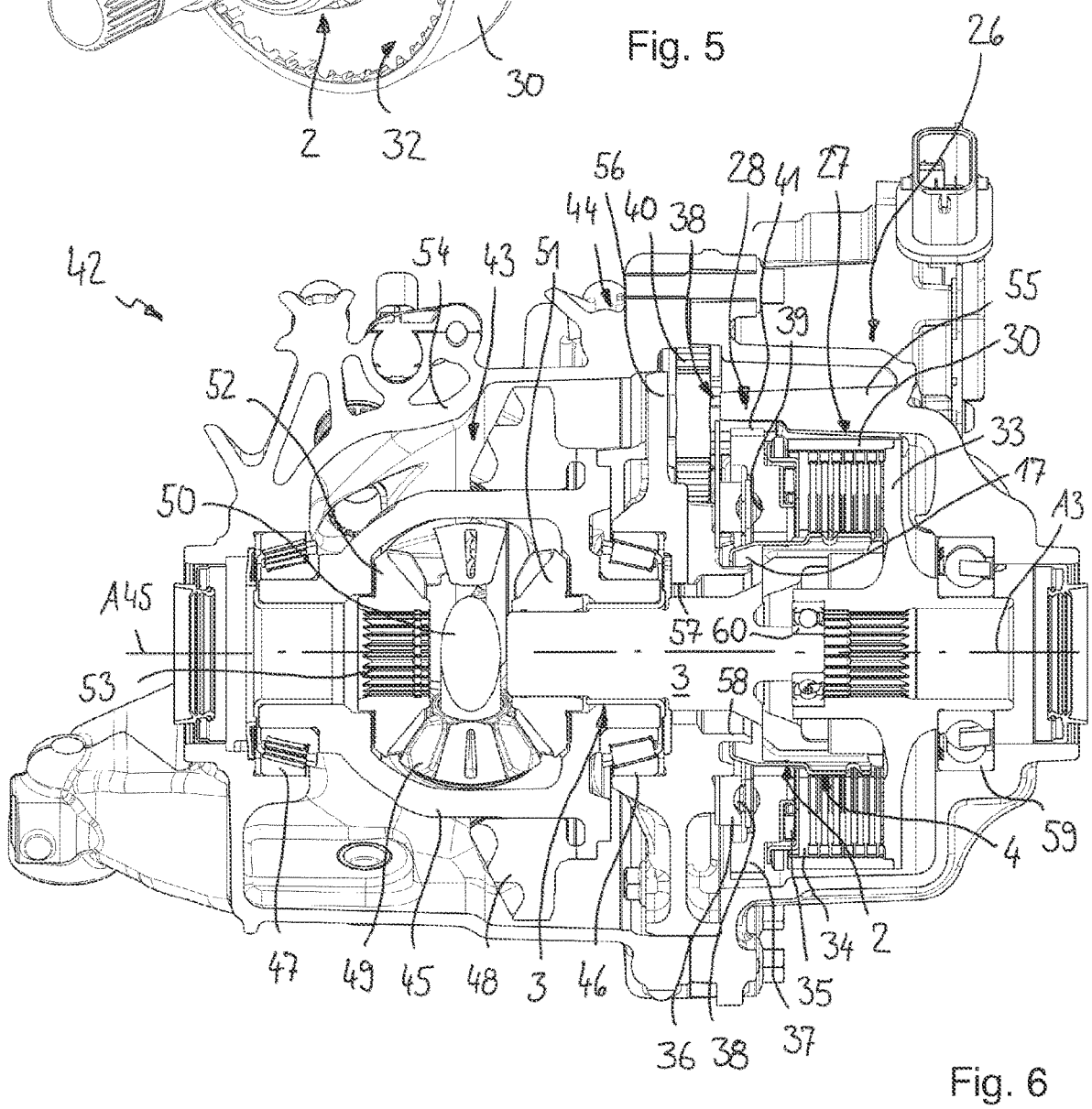
FIG. 6 shows a transmission assembly with a clutch unit from FIG. 5 in a longitudinal section.

FIG. 5 shows a clutch unit 26 with a fluid guide assembly 2 in perspective view, further details of which can be seen in FIG. 6, which shows a longitudinal section through the clutch.

The clutch unit 26 comprises a wet friction disk clutch 27 and an actuating device 28 for controlling the torque transmittable by the friction disk clutch.

The friction disk clutch 27 comprises the inner disk carrier 3, to which inner disks 29 are connected in a rotationally fixed and axially movable manner, and an outer disk carrier 30, to which outer disks 31 are connected in an axially movable and rotationally fixed manner. The outer disks 31 and inner disks 29 are arranged axially alternately. The outer disks 31 and inner disks 29 together form a disk pack 32. The disk pack 32 is axially supported in a first axial direction against a support portion 33 of the outer disk carrier 30. A pressure plate 34, which is axially movable by the controllable actuating device 28, is provided for acting on the disk pack 32. The outer disk carrier 30 is rotatably mounted about the axis of rotation A3 via a first bearing 59 in the housing 44 and a second bearing 60 on a journal portion of the inner disk carrier 3.

The actuating device 28 is designed and/or controllable such that the torque to be transmitted by the friction disk clutch 27 can be variably adjusted as required. In addition to the open position, in which no torque is transmitted between the inner disk carrier 3 and the outer disk carrier 30, and a closed position, in which the disk carriers jointly rotate about the axis of rotation and the full torque is transmitted, any intermediate position can also be realized by control of the friction plate clutch 27. The torque to be transmitted can, for example, be determined in an electronic control unit (ECU) on the basis of continuously sensed driving state variables of the motor vehicle. The electronic control unit can pass on a corresponding control signal to the actuating device 28, which then applies the appropriate force to the pressure plate 34 so that the desired torque is transmitted by the friction disk clutch 27.

A thrust bearing 35 is provided between the actuating device 28 and the friction disk clutch 27. The thrust bearing 35 enables axial force transmission from the actuating device to the pressure plate 34 with simultaneous rotational decoupling. The actuating device 28 comprises a ball ramp mechanism and a drive unit. The ball ramp mechanism has a support ring 36, which is axially supported against a stationary component, and a setting ring 37, which is opposite the support ring 36 and is rotatably drivable about the axis of rotation A3. Ball grooves 38, 39 are arranged in the opposing end faces of the support ring 36 and the setting ring 37. The ball grooves 38, 39 are distributed over the circumference. The ball grooves 38, 39 have a variable depth over the circumference and in each of which a ball is received. To actuate the ball ramp unit, an electric motor (not shown) serves as the drive. The electric motor can rotate the setting ring 37 relative to the supporting ring 36 via a gearing 38. The gearing 38 comprises a drive gear 40 which is rotationally driven by the electric motor and which is drivingly connected to an output gear 41. The output gear 41 is connected to the setting ring 37. The output gear 41 and the setting ring 37 may be formed in one piece.

When the drive gear 40 is rotated by the electric motor, the output gear 41 and thus the setting ring 37 are rotated relative to the support ring 36. Depending on the direction of rotation of the motor shaft, the setting ring 37 can be rotated in a first direction of rotation or in an opposite second direction of rotation. Starting from an initial position in which the two rings 36, 37 are axially close to each other, a rotation of the setting ring 37 relative to the supporting ring 36 in the first direction of rotation causes the balls held in the ball grooves to run into areas of lesser depth, so that the setting ring moves axially in the direction of the clutch 27. The setting ring 37 is axially supported via the axial bearing 35 against the pressure plate 34, which acts on the disk pack. In this way the clutch 27 is closed. In the fully closed state, the disk pack is loaded to the maximum so that the full torque is transmitted between the inner disk carrier 3 and the outer disk carrier 30. If the electric motor, and thus the setting ring 37, is rotated in the opposite second direction of rotation, the balls held in the ball grooves move again into areas of greater groove depth, wherein the setting ring can be loaded and/or moved axially in the direction of the support ring by spring means not shown. In this way, the clutch 28 can be opened again.

The clutch unit 26 provides very good cooling of the disk pack even at low speeds and high torques. The clutch unit 26 can in principle be used at any place within the drive train of a motor vehicle. An example clutch unit 26 in a transmission assembly 42 is shown in FIG. 6, which is described below.

The transmission assembly 42 comprises a differential gearing 43 with a stationary housing 44, in which a differential basket 45 is mounted rotatably about an axis of rotation A45 by two bearings 46, 47. For introducing a torque into the differential basket 45, a ring gear 48 is provided which is firmly connected to the differential basket, for example by a welded connection or bolted connections. A plurality of differential gears 49 are mounted in the differential basket 45 on a journal 50 so as to rotate about a journal axis. The two differential gears 49 rotate jointly with the differential basket 45 and are each in meshing engagement with a first and a second output gear 51, 52 which are arranged coaxially with the axis of rotation A45. The two output gears 51, 52, which may also be referred to as side shaft gears, each have longitudinal splines 53 in which a corresponding mating spline of a drive shaft can engage for torque transmission. The two output gears 51, 52 can be axially supported relative to the differential basket 45 via interposed sliding disks.

The housing 44 is designed in particular in several parts and comprises a transmission-side housing portion 54, in which the differential gearing 43 is accommodated, and a clutch-side housing portion 55, in which the clutch unit 26 is accommodated. The two housing portions are connected to each other via flanges, without being limited thereto. An intermediate plate 56 is provided between the two housing portions 54, 55, in which the bearing 46 for the differential basket 45 is accommodated. The inner disk carrier 3 of the clutch unit 26 is connected to the drive gear 51, which is adjacent to the clutch and extends through a through opening 57 in the intermediate plate 56. The actuating device 28 is arranged axially between the intermediate plate 56 and the clutch unit 26, with the support ring 36 being axially supported against the intermediate plate. In the region of the fluid conducting element 4, the intermediate plate 56 has a sleeve-shaped projection 58 or collar which extends into the annular space 17 of the fluid conducting element with axial overlap with the catch portion 12. This forms an oil labyrinth so that oil spraying around can be guided from the sleeve projection into the annular space 17 and from there into the channels 21.

The transmission assembly 42 can provide and transmit high torques to the two sideshafts at low speeds due to the efficient lubrication system of the clutch unit 26. Thereby, the fluid distribution assembly 2 has a favorable effect to call up the full potential of the controllable clutch. The oil flowing through the clutch can also cool and lubricate other movable mechanical components such as bearings or seals of the clutch unit 26 or the transmission.

LIST OF REFERENCE SIGNS

2 fluid guide assembly
3 inner disk carrier
4 fluid guide element
5 carrier portion
6 shaft portion
7 shoulder portion
8 connecting structure
9 projections
10 recesses
11 longitudinal grooves
12 catch portion
13 tab portion
14 through opening
15 inner wall
16 neck
17 annular chamber
18 connecting portion
19 outer circumferential face
20 depression/sink
21 channel
22 recess
23 longitudinal opening
24 radial opening
25 inner recess
26 clutch unit
27 friction disk clutch
28 actuating unit
29 inner disks
30 outer disk carrier
31 outer disks
32 disk pack
33 support plate
34 pressure plate
35 axial bearing
36 support ring
37 Setting ring
38 ball grooves
39 ball grooves
40 drive gear
41 output gear
42 transmission assembly
43 differential gearing
44 housing
45 differential basket
46 bearing
47 bearing
48 ring gear
49 differential gears
50 pin
51 output gear
52 output gear
53 longitudinal toothing
54 housing portion
55 housing portion
56 intermediate plate
57 trough opening
58 extension
59 bearing
60 bearing
A axis
R radius

The invention claimed is:

1. A fluid guide assembly for a friction disk clutch comprising:
an inner disk carrier with a longitudinal axis and with a carrier portion, a shoulder portion, and a shaft portion, wherein the carrier portion comprises a connecting structure with projections and recesses distributed over a circumference and radially outside in order to receive inner disks with a corresponding counter structure in a rotationally fixed and axially movable manner; and
a fluid guide element which is axially fixedly connected to the inner disk carrier, the fluid guide element having an annular catch portion in which inflowing fluid can be caught, and a plurality of circumferentially distributed tab portions which extend in axial direction and which each have a radial through-opening;

wherein the inner disk carrier at a radially outer side comprises a plurality of longitudinal grooves over the circumference which extend axially from the shoulder portion into the carrier portion; and wherein the tab portions of the fluid guide element cover the longitudinal grooves of the inner disk carrier so that a channel for the fluid is respectively formed between them, wherein the fluid guide element includes a connecting portion which is fitted onto an outer circumferential face of the shoulder portion of the inner disk carrier.

2. The fluid guide assembly according to claim 1, wherein the fluid guide element is connected to the inner disk carrier by an axial press-fit.

3. The fluid guide assembly according to claim 1, wherein the tab portions of the fluid guide element comprise radially outwardly directed depressions.

4. The fluid guide assembly according to claim 1, wherein the annular catch portion of the fluid guide element extends axially beyond the shoulder portion and includes a radial neck at its axial end and widens conically in the axial direction towards the connecting portion.

5. The fluid guide assembly according to claim 1, wherein at least a partial number of the radial through-openings of the tab portions are arranged axially offset from one another.

6. The fluid guide assembly according to claim 1, wherein the fluid conducting element has at least three tab portions which are distributed uniformly over the circumference.

7. The fluid guide assembly according to claim 1, wherein the tab portions, in radial view respectively, cover a clear area of the respective longitudinal grooves by at least 90%.

8. The fluid guide assembly according to claim 1, wherein the longitudinal grooves are each arranged in the circumferential direction between two recesses of the connecting structure, and wherein a maximum width of the tab portions is smaller than a circumferential distance between three circumferentially adjacent recesses of the connecting structure.

9. The fluid guide assembly according to claim 1, wherein a bottom of the longitudinal grooves of the inner disk carrier lies on a smaller radius than a deepest region of the connecting structure for the inner disks.

10. The fluid guide assembly according to claim 1, wherein the longitudinal grooves extending axially from the shoulder portion into the carrier portion comprise radially inwardly directed recesses in the shoulder portion and are closed in the axial direction at an end opposite to the shoulder portion.

11. The fluid guide assembly according to claim 1, wherein the inner disk carrier is produced as a forged part, with the longitudinal grooves and the connecting structure being formed in by forging.

12. The fluid guide assembly according to claim 1, wherein the inner disk carrier has a central longitudinal bore and a plurality of circumferentially distributed radial through-openings to the longitudinal grooves.

13. The fluid guide assembly according to claim 12, wherein the central longitudinal bore has an inner recess, wherein the radial through-openings are formed in the axial overlap region of the inner recess with the outer longitudinal grooves.

14. A clutch unit for a driveline of a motor vehicle, comprising:

a fluid guide assembly including an inner disk carrier with a longitudinal axis and with a carrier portion, a shoulder portion, and a shaft portion, wherein the carrier portion comprises a connecting structure with projections and recesses distributed over the circumference, and radially outside, to receive inner disks with a corresponding counter structure in a rotationally fixed and axially movable manner, with the fluid guide assembly further including a fluid guide element which is axially fixedly connected to the inner disk carrier, the fluid guide element having an annular catch portion in which inflowing fluid can be caught, and a plurality of circumferentially distributed tab portions which extend in axial direction and which each have a radial through-opening; wherein the inner disk carrier at a radially outer side comprises a plurality of longitudinal grooves over the circumference which extend axially from the shoulder portion into the carrier portion; and wherein the tab portions of the fluid guide element cover the longitudinal grooves of the inner disk carrier so that a channel for the fluid is respectively formed between them, the clutch unit further comprising:

a wet friction disk clutch comprising an outer disk carrier in which a disk pack composed of outer disks and inner disks is arranged;

a support plate against which the disk pack is axially supported; an axially movable pressure plate for axially acting on the disk pack; and an actuating device for operating the friction disk clutch by axially moving the pressure plate;

wherein the inner disk carrier is rotatably supported about the axis of rotation relative to the outer disk carrier; and wherein inner disks of the disk pack are connected to the connecting structure of the inner disk carrier in a rotationally fixed and axially movable manner, so that when the inner disk carrier rotates, oil flows from the catching portion along the inner wall of the fluid guide member to the tab portions to lubricate the disk pack, wherein the inner disk carrier is rotatably supported in a housing, and wherein the housing includes a sleeve extension which extends axially into the annular space of the fluid guide element, thereby forming a fluid labyrinth.

15. A fluid guide assembly for a friction disk clutch comprising:

an inner disk carrier with a longitudinal axis and with a carrier portion, a shoulder portion, and a shaft portion, wherein the carrier portion comprises a connecting structure with projections and recesses distributed over the circumference, and radially outside, to receive inner disks with a corresponding counter structure in a rotationally fixed and axially movable manner, and a fluid guide element which is axially fixedly connected to the inner disk carrier, the fluid guide element having an annular catch portion in which inflowing fluid can be caught, and a plurality of circumferentially distributed tab portions which extend in axial direction and which each have a radial through-opening;

wherein the inner disk carrier at a radially outer side comprises a plurality of longitudinal grooves over the circumference which extend axially from the shoulder portion into the carrier portion; and wherein the tab portions of the fluid guide element cover the longitudinal grooves of the inner disk carrier so that a channel for the fluid is respectively formed between them, wherein the longitudinal grooves extending axially from the shoulder portion into the carrier portion comprise radially inwardly directed recesses in the shoulder portion and are closed in the axial direction at an end opposite to the shoulder portion.

16. The fluid guide assembly according to claim 15, wherein the fluid guide element includes a connecting portion which is fitted onto an outer circumferential face of the shoulder portion of the inner disk carrier.

17. The fluid guide assembly according to claim 15, wherein the tab portions, viewed radially, cover a clear area of the respective longitudinal grooves by at least 90%.

18. The fluid guide assembly according to claim 15, wherein at least a partial number of the radial through-openings of the tab portions are arranged axially offset from one another.

* * * * *